US012610446B2

(12) United States Patent
Gerges et al.

(10) Patent No.: US 12,610,446 B2
(45) Date of Patent: Apr. 21, 2026

(54) ADAPTIVE ILLUMINANCE CONTROL

(71) Applicant: University of Washington, Seattle, WA (US)

(72) Inventors: Mark Gerges, Seattle, WA (US); Xu Chen, Seattle, WA (US)

(73) Assignee: University of Washington, Seattle, WA (US)

( * ) Notice: Subject to any disclaimer, the term of this patent is extended or adjusted under 35 U.S.C. 154(b) by 221 days.

(21) Appl. No.: 18/557,128

(22) PCT Filed: Apr. 25, 2022

(86) PCT No.: PCT/US2022/026232
§ 371 (c)(1),
(2) Date: Oct. 25, 2023

(87) PCT Pub. No.: WO2022/232073
PCT Pub. Date: Nov. 3, 2022

(65) Prior Publication Data
US 2024/0215136 A1 Jun. 27, 2024

Related U.S. Application Data

(60) Provisional application No. 63/180,631, filed on Apr. 27, 2021.

(51) Int. Cl.
*H05B 47/175* (2020.01)
*G06F 3/0484* (2022.01)
*H05B 47/105* (2020.01)
(52) U.S. Cl.
CPC ......... *H05B 47/196* (2024.01); *H05B 47/105* (2020.01); *G06F 3/0484* (2013.01)

(58) Field of Classification Search
CPC ...... G01J 1/0228; G01J 1/0266; G01J 1/0492; G01J 2001/4247; G01N 2021/8809; G06F 3/0484; H05B 47/105; H05B 47/196
See application file for complete search history.

(56) References Cited

U.S. PATENT DOCUMENTS 4,449,818 A   5/1984 Yamaguchi et al.
6,796,690 B2   9/2004 Bohlander
(Continued)

FOREIGN PATENT DOCUMENTS

CN   112255246 A   1/2021
CN   212486633 U   2/2021
(Continued)

OTHER PUBLICATIONS

International Search Report of Int'l Application No. PCT/US2022/026232, mailed Aug. 4, 2022, 4 pages.
(Continued)

*Primary Examiner* — Raymond R Chai
(74) *Attorney, Agent, or Firm* — McDonnell Boehnen Hulbert & Berghoff LLP

(57) ABSTRACT

A method includes receiving, via. a. user interface of a computing device, input indicating target illuminances that correspond to surfaces of an object, determining, via the computing device, power levels for compensatory light sources based on the target illuminances and positions and orientations of the surfaces with respect to the compensatory light sources, and causing, via. the computing device, the compensatory light sources to operate according to the power levels.

20 Claims, 3 Drawing Sheets

(56) References Cited

U.S. PATENT DOCUMENTS

| | | | | |
|---|---|---|---|---|
| 7,787,159 | B2 | 8/2010 | Baldwin | |
| 2013/0093360 | A1* | 4/2013 | Vinther | H05B 45/20 |
| | | | | 315/312 |
| 2014/0333209 | A1* | 11/2014 | Bao | H05B 47/125 |
| | | | | 315/153 |
| 2015/0262116 | A1 | 9/2015 | Katircioglu et al. | |
| 2016/0278186 | A1* | 9/2016 | Van De Sluis | H05B 47/11 |
| 2016/0295672 | A1* | 10/2016 | Murdoch | H05B 47/155 |
| 2019/0271455 | A1* | 9/2019 | Foster | F21V 21/30 |
| 2019/0313507 | A1* | 10/2019 | Kim | H05B 47/11 |
| 2021/0262623 | A1 | 8/2021 | Magno et al. | |
| 2021/0318636 | A1 | 10/2021 | Iwai et al. | |
| 2024/0172349 | A1* | 5/2024 | Coleman | G01S 17/89 |
| 2024/0215136 | A1* | 6/2024 | Gerges | H05B 47/105 |
| 2025/0126691 | A1* | 4/2025 | Casey | H05B 47/105 |

FOREIGN PATENT DOCUMENTS

| | | | | |
|---|---|---|---|---|
| CN | 213930539 U | 8/2021 | | |
| CN | 214069981 U | 8/2021 | | |
| CN | 214097211 U | 8/2021 | | |
| CN | 113344865 A | 9/2021 | | |
| EP | 2822363 A2 | 1/2015 | | |
| JP | 63-100359 A | 5/1988 | | |
| KR | 10-2019-0116782 A | 10/2019 | | |
| KR | 20190116782 A | 10/2019 | | |
| TW | 202126024 A | 7/2021 | | |
| WO | WO-2013072815 A1 * | 5/2013 | ........... | H05B 47/155 |
| WO | 2021129283 A1 | 7/2021 | | |
| WO | 2021199652 A1 | 10/2021 | | |
| WO | 2021235115 A1 | 11/2021 | | |

OTHER PUBLICATIONS

Written Opinion of Int'l Application No. PCT/US2022/026232, mailed Aug. 4, 2022, 5 pages.

"Aircraft Engine Market Size, Share & Industry Growth Analysis Report byType (Turboprop, Turbofan, Turboshaft, Piston Engine), Platform (Fixedwing, Rotary Wing, UAV), Component(Compressor, Turbine, Gear Box, Exhaust Nozzle, Fuel System), Technology, and Global Growth Driver andIndustry Forecast to 2026", Aircraft Engine Market Size Growth Opportunities Industry Trends and Analysis 2026, 2017, 1-12.

Anand et al., "A Guide for Machine Vision in Quality Control", CRC Press, Taylor & Francis Group, 2020, 1-38.

Aslam et al., "Principles of disability glare measurement: an ophthalmological perspective", Acta Ophthalmol. Scand., 85(4), 2007, 354-360.

Boyadzhiev et al., "User-assisted Image Compositing for Photographic Lighting", Computer Graphics—Image Processing And Computer Vision, 1-11.

Brauny, P., "Repair of air-cooled turbine vanes of high-performance aircraft engines—problems and experience", Materials science and technology, 1985, 1(9), 719-727.

Cai et al., "Evaluating discomfort glare from non-uniform electric light sources", Lighting Res. Technol., 2013, 45(3), 267-294.

Campa et al., "Simulation Environment for Machine Vision Based Aerial Refueling for UAVs", IEEE Transactions on Aerospace and Electronic Systems, 2009, 45(1), 138-151.

Chen et al., "Machine vision technology for agricultural applications", Computers and Electronics in Agriculture, 2002, 36(2-3), 173-191.

Araman, P., "Machine vision technology for the forest products Industry", IEEE Xplore, 1997, 30(7), 43-48.

Bedocs et al., "Discomfort glare in interior lighting", CIE, 1995, 1-3.

French et al., "Intelligent Sensing for Robotic Re-Manufacturing in Aerospace—An Industry 4.0 Design Based Prototype", IEEE, 2017, 272-277.

Gerges, M., "Provision of Controlled and Consistent Light Distribution Over an Uneven Topography to Maximize Efficacy of Machine-Vision based Defect Identification", University of Washington, 2021, 79 pages.

Golnabi et al., "Design and application of industrial machine vision systems", ScienceDirect, Robotics and Computer-Integrated Manufacturing, 23(6), 2007, 630-637.

Henderson et al., "Erosion, Corrosion and Foreign Object Damage Effects in Gas Turbines", Agard Conference Proceedings 558, 1994, 342 pages.

Hornberg, A., "Handbook of Machine Vision", Wiley Online Books, 2006, 26 pages.

Huang et al., "Surface damage detection for steel wire ropes using deep learning and computer vision techniques", Measurement, 2020, vol. 161, 12 pages.

Hung et al., "Home Outlet and LED Array La mp Controlled by a Smartphone with a Hand Gesture Recognition", IEEE International Conference on Consumer Electronics (ICCE), 2016, 5-6.

Jie et al., "Real-time Rail Head Surface Defect Detection: a Geometrical Approach", IEEE International Symposium on Industrial Electronics, 2009, 769-774.

Kumar et al., "Image Forensics Based on Lighting Estimation", International Journal of Image and Graphics, 2019, 19(3), 1950014, 11pages.

Kurdthongmee et al., "An Automatic System for Non-Uniform Brightness Compensation of LED Arrays: Image Processing Routines to Locate LED Centers", Walailak J Sci & Tech, 2008, 5(2): 203-216.

Li et al., "Automatic detection of common surface defects on oranges using combined lighting transform and image ratio methods", Postharvest Biology and Technology, 2013, vol. 82, 59-69.

Li et al., "Improved illumination for vision-based defect inspection of highly reflective metal surface", Chinese Optics Letters, 2013, col. 11(2), 021102-1-021102-4, 4 pages.

Liu et al., "Integrated imaging and vision techniques for industrial inspection: a special issue on machine vision and applications", Machine Vision and Applications, 2010, 21(5), 597-599.

Martin, D., "A Practical Guide to Machine Vision Lighting—Part II", Machine Vision Fundamentals, No. Figure 6, 2013, 7-9.

Martin, D., "Basic Lighting Techniques for Machine Vision", AIA, 2016, 68 pages.

Pastorius, W. J., "Machine Vision for Industrial Inspection Metrology and Guidance", IEEE, 1988, 5 pages.

Phar, "Physically Based Rendering: From Theory to Implementation", 2014, 4 pages.

Qu et al., "Detection of Random Defects on Highly Reflective and Complex Surfaces", Key Engineering Materials, 2005, ISSN: 1662-9795, vols. 295-296, 233-238.

Renshaw et al., "Synthetic Defects for Vibrothermography", AIP Conf. Proc., vol. 1211, 2010, 498-504.

Rindorff, H. J., "Luminance Reflectances Explanation and calculation of contrast", 1978, 15 pages.

Sampson, B., "Introduction to non-destructive testing", Aerospace Testing International, 2018, 15 pages.

Satti et al., "An automatic leaf recognition system for plant identification using machine vision technology", International Journal of Engineering Science and Technology, 2013, 5(4), 7 pages.

Sheng-hua, Y., "An automatic inspection system for random defects on strongly reflective and complex surface", Engineering, 2003, 2 pages.

Stern et al., "Adaptive Color Space Switching for Face Tracking in Multi-Colored Lighting Environments", IEEE, 2002, 6 pages.

Taylor et al., "Illumination Fundamentals", Lighting Research Center, Rensselaer Polytechnic Institute, 2000, 48 pages.

WS2812B LED Intelligent control integrated light source, https://voltiq.ru/shop/ws2812b-led-strip-3060/, printed 2016, 6 pages.

Zemmour et al., "Automatic Parameter Tuning for Adaptive Thresholding in Fruit Detection", Sensors, 2019, vol. 19, 2130, 21 pages.

Zhang et al., "Optimization of Light-source Position in Appearance Inspection for Surface with Specular Reflection", IEEE, 2013, 602-607.

(56) References Cited

OTHER PUBLICATIONS

Zhou et al., "An Automatic Surface Defect Inspection System for Automobiles Using Machine Vision Methods", Sensors, 2019, 19(3), 644, 18 pages.

* cited by examiner

RECEIVING, VIA A USER INTERFACE OF A COMPUTING DEVICE, INPUT INDICATING TARGET ILLUMINANCES THAT CORRESPOND TO SURFACES OF AN OBJECT

402

DETERMINING, VIA THE COMPUTING DEVICE, POWER LEVELS FOR COMPENSATORY LIGHT SOURCES BASED ON THE TARGET ILLUMINANCES AND POSITIONS AND ORIENTATIONS OF THE SURFACES WITH RESPECT TO THE COMPENSATORY LIGHT SOURCES

404

CAUSING, VIA THE COMPUTING DEVICE, THE COMPENSATORY LIGHT SOURCES TO OPERATE ACCORDING TO THE POWER LEVELS

400

ADAPTIVE ILLUMINANCE CONTROL

CROSS-REFERENCE TO RELATED APPLICATIONS

This application is a § 371 national phase of international application no. PCT/US2022/026232, filed Apr. 25, 2022, which claims priority to U.S. Provisional Patent Application No. 63/180,631, filed on Apr. 27, 2021, the entire contents of both of which are incorporated by reference herein.

Also incorporated by reference herein is "Provision of Controlled and Consistent Light Distribution Over an Uneven Topography to Maximize Efficacy of Machine-Vision based Defect Identification," Mark Gerges.

BACKGROUND

Computers can be used to analyze images of manufactured components to identify manufacturing or design defects. However, the performance of such computer-aided image analysis is generally dependent on how well the component is illuminated when the image is captured. Adding to the difficulty, the lighting conditions that yield an image that is optimal for computer analysis will generally vary based on the shape and composition of the component.

SUMMARY

A first example is a method comprising: receiving, via a user interface of a computing device, input indicating target illuminances that correspond to surfaces of an object; determining, via the computing device, power levels for compensatory light sources based on the target illuminances and positions and orientations of the surfaces with respect to the compensatory light sources; and causing, via the computing device, the compensatory light sources to operate according to the power levels.

A second example is a non-transitory computer readable medium storing instructions that, when executed by a computing device, cause the computing device to perform functions comprising: receiving, via a user interface of the computing device, input indicating target illuminances that correspond to surfaces of an object; determining, via the computing device, power levels for compensatory light sources based on the target illuminances and positions and orientations of the surfaces with respect to the compensatory light sources; and causing, via the computing device, the compensatory light sources to operate according to the power levels.

A third example is a computing device comprising: a user interface; one or more processors; and a computer readable medium storing instructions that, when executed by the one or more processors, cause the computing device to perform functions comprising: receiving, via the user interface of the computing device, input indicating target illuminances that correspond to surfaces of an object; determining, via the computing device, power levels for compensatory light sources based on the target illuminances and positions and orientations of the surfaces with respect to the compensatory light sources; and causing, via the computing device, the compensatory light sources to operate according to the power levels.

When the term "substantially" or "about" is used herein, it is meant that the recited characteristic, parameter, or value need not be achieved exactly, but that deviations or variations, including, for example, tolerances, measurement error, measurement accuracy limitations, and other factors known to those of skill in the art may occur in amounts that do not preclude the effect the characteristic was intended to provide. In some examples disclosed herein, "substantially" or "about" means within +/−0-5% of the recited value.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

BRIEF DESCRIPTION OF THE DRAWINGS

FIG. 3 is a block diagram of a method, according to an example.

DETAILED DESCRIPTION

As noted above, more reliable methods for illuminating manufactured components for image capture are needed. Examples of such methods and devices are discussed in the present disclosure.

Figure 1:
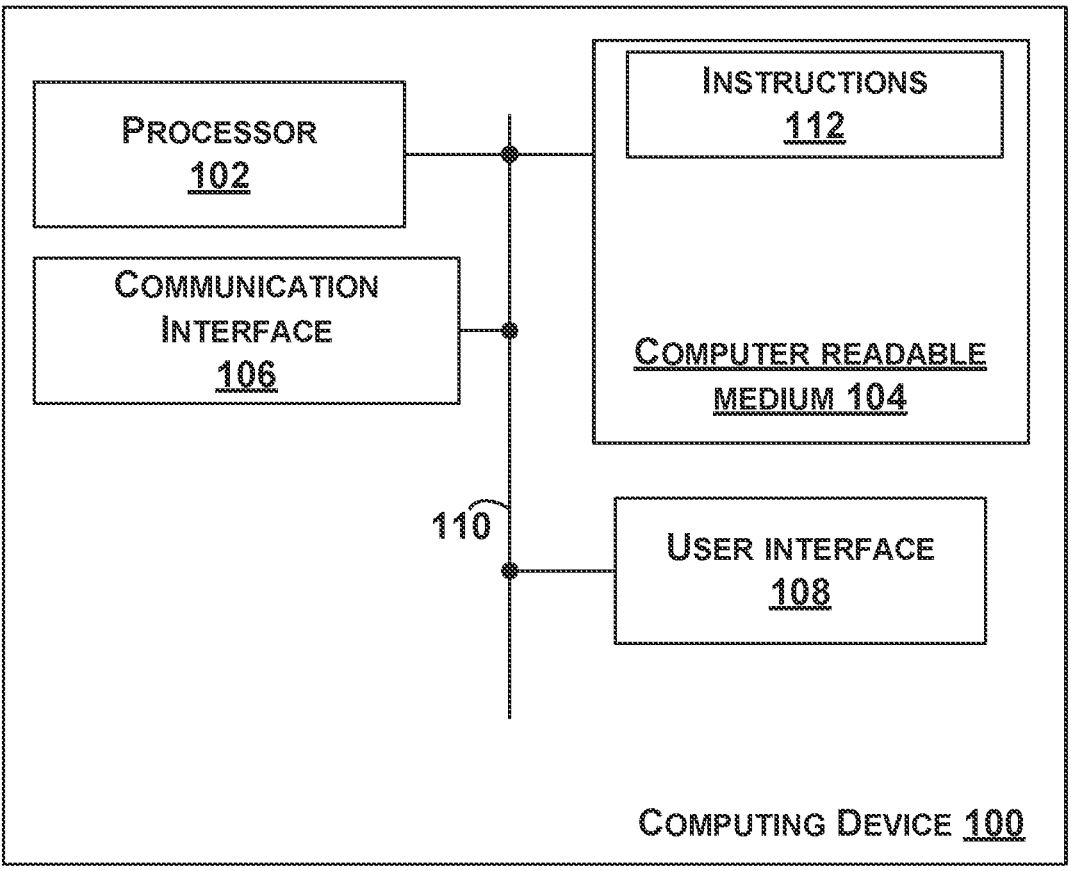
FIG. 1 is a block diagram of a computing device, according to an example.

FIG. 1 is a block diagram of a computing device 100. The computing device 100 includes one or more processors 102, a non-transitory computer readable medium 104, a communication interface 106, and a user interface 108. Components of the computing device 100 are linked together by a system bus, network, or other connection mechanism 110.

The one or more processors 102 can be any type of processor(s), such as a microprocessor, a field programmable gate array, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 can store instructions 112. The instructions 112 are executable by the one or more processors 102 to cause the computing device 100 to perform any of the functions or methods described herein.

The communication interface 106 can include hardware to enable communication within the computing device 100 and/or between the computing device 100 and one or more other devices. The hardware can include any type of input and/or output interfaces, a universal serial bus (USB), PCI Express, transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices. The communication interface 106 can also include analog-to-digital converters (ADCs) or digital-to-analog converters (DACs) that the computing device 100 can use to control various components of the computing device 100 or external devices.

The user interface 108 can include any type of display component configured to display data. As one example, the user interface 108 can include a touchscreen display. As another example, the user interface 108 can include a flat-panel display, such as a liquid-crystal display (LCD) or a light-emitting diode (LED) display. The user interface 108 can include one or more pieces of hardware used to provide data and control signals to the computing device 100. For instance, the user interface 108 can include a mouse or a pointing device, a keyboard or a keypad, a microphone, a touchpad, or a touchscreen, among other possible types of user input devices. Generally, the user interface 108 can enable an operator to interact with a graphical user interface (GUI) provided by the computing device 100 (e.g., displayed by the user interface 108).

Figure 2:
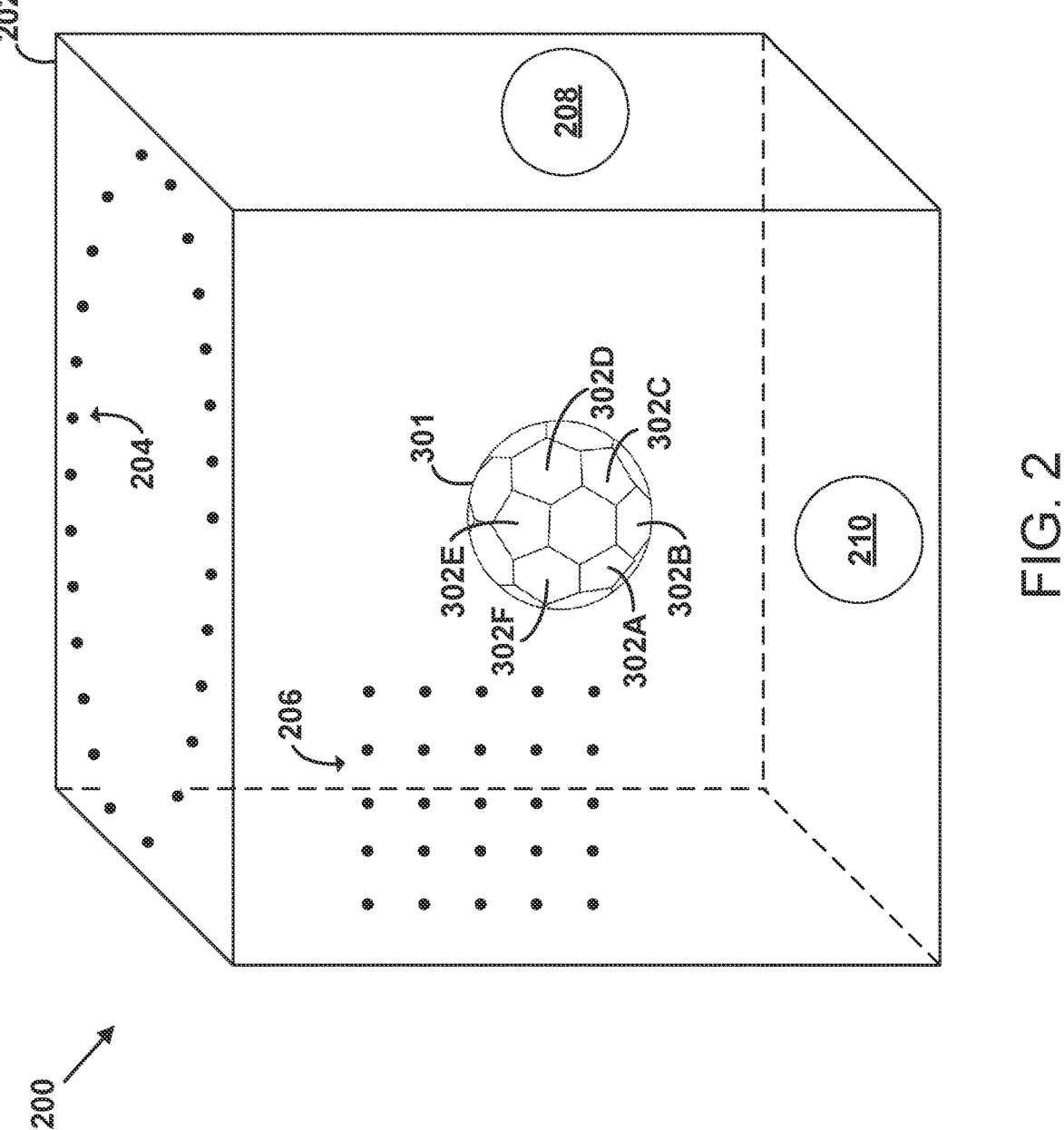
FIG. 2 is a schematic diagram of a lighting system, according to an example.

FIG. 2 is a schematic diagram of a lighting system 200. The lighting system 200 includes an enclosure 202, background light sources 204, compensatory light sources 206, a photosensor 208, and a camera 210. Also shown within the enclosure 202 is an object 301 that includes a surface 302A, a surface 302B, a surface 302C, a surface 302D, a surface 302E, a surface 302F, and other unlabeled surfaces.

The enclosure 202 is a container (e.g., a box, a tent, or a room) made of material that transmits very little or zero visible light (e.g., black or other dark colored materials). The enclosure 202 typically has rough and/or non-reflective surfaces that are highly absorptive of visible light. Thus, when the enclosure 202 is closed, any light generated by the background light sources 204 or the compensatory light sources 206 and/or reflected by the object 301 is contained within the enclosure 202.

The background light sources 204 are mounted to an underside of the top surface of the enclosure 202. As shown, the background light sources 204 (e.g. light emitting diodes (LEDs)) include an array of light sources forming a ring shape, but other shapes are possible such as a rectangle. The background light sources 204 can be considered the "main" source of light that is used to illuminate the object 301 so that the camera 210 can capture images of the object 301. In some examples, the background light sources 204 are adjustable in unison, that is, the background light sources 204 all operate at the same power level and/or color setting. In some examples, each of the LEDs constituting the background light sources 204 includes a set of three LEDs including one red LED, one green LED, and one blue LED that have independently controlled power levels. The background light sources 204 can include one or more light sources capable of emitting light of varying colors in other ways as well. In some examples, the background light sources 204 are configured to emit visible light, ultraviolet light, and/or infrared light.

The compensatory light sources 206 are an array of light sources that can have any of the characteristics of the background light sources 204 described above. As shown, the compensatory light sources 206 form an array having a square grid shape, but other shapes are possible. The compensatory light sources 206 can be mounted onto an articulating arm (not shown) such that the position and/or orientation of the compensatory light sources 206 can be changed. In another example, each of the compensatory light sources

206 could be mounted on its own articulating arm such that the position and/or orientation of each of the compensatory light sources 206 is independently adjustable. Additionally, the power level (e.g., intensity) and/or color of each of the compensatory light sources 206 is independently controllable via the computing device 100.

The photosensor 208 can include an Arduino sensor, a light meter, a photodiode, a photodetector, a charge-coupled device, a CMOS sensor, or any other sensor configured to generate an electrical signal that indicates an illuminance upon the photosensor 208. The photosensor 208 can generally be positioned at any location within the enclosure 202 to measure illuminance at a particular position and orientation within the enclosure 202. The computing device 100 is configured to receive and analyze output from the photosensor 208. In FIG. 2, only one photosensor 208 is shown, however many photosensors could be used in various examples. The position of the photosensor 208 in FIG. 2 is chosen not to obscure the object 301, but it should be understood that the photosensor 208 can generally be at any position within the enclosure 202 as necessary to measure light exposure at various surfaces of the object 301.

The camera 210 can take the form of any device that includes an image sensor such as a charge-coupled device or a CMOS sensor. The camera 210 is configured to capture ultraviolet images, visible light images, and/or infrared images of the object 301. The position of the camera 210 in FIG. 2 is chosen not to obscure the object 301, but it should be understood that the camera 210 can generally be at any position within the enclosure 202 as necessary to capture images of various surfaces of the object 301.

The object 301 can take the form of any item, for example, a manufactured component that is to be inspected. The camera 210 is used to capture images of the surfaces 302A-F under various lighting conditions generated by the background light sources 204 and/or the compensatory light sources 206. In FIG. 2, the object 301 has a 32-sided polygonal shape, but other well-defined or irregular shapes are possible as well. As such, the surfaces of the object and boundaries between those surfaces in other examples can be more arbitrarily defined.

In operation, the computing device 100 receives, via the user interface 108 of the computing device 100, input indicating target illuminances $E_{1D\text{-}6D}$ that correspond to the surfaces 302A-F of the object 301. The computing device 100 also determines power levels for the compensatory light sources 206 based on the target illuminances $E_{1D\text{-}6D}$ and positions and orientations of the surfaces 302A-F with respect to the compensatory light sources 206. The computing device 100 also causes the compensatory light sources 206 to operate according to the power levels determined by the computing device 100.

For example, the input indicates a target illuminance $E_{1D}$ corresponding to the surface 302A, a target illuminance $E_{2D}$ corresponding to the surface 302B, a target illuminance $E_{3D}$ corresponding to the surface 302C, a target illuminance $E_{4D}$ corresponding to the surface 302D, a target illuminance $E_{5D}$ corresponding to the surface 302E, and a target illuminance $E_{6D}$ corresponding to the surface 302F. The target illuminances $E_{1D\text{-}6D}$ are generally the illuminances desired by a user for each of the surfaces 302A-F of the object 301 for image capture by the camera 210.

In various examples, the input received by the user interface 108 can include numerous types of additional information that can be used by the computing device 100 to determine the power levels for the compensatory light sources 206. In some examples, the input received by the user interface 108 indicates the positions and/or orientations of the surfaces 302A-F. For instance, the positions and/or orientations of the surfaces 302A-F could be defined by the input via Cartesian, cylindrical, or spherical coordinates.

Similarly, the input received by the user interface 108 can indicate the positions and/or orientations of the compensatory light sources 206 and/or the background light sources 204 via Cartesian, cylindrical, or spherical coordinates.

In some examples, it may be beneficial to illuminate the surface 302A more intensely than the surface 302B due to the surface 302A being less reflective and/or more absorptive of light than the surface 302B. As such, the input received by the user interface 108 can indicate the target illuminance $E_{1D}$ as being greater than the target illuminance $E_{2D}$.

In additional examples, it may be beneficial to illuminate the surface 302A and the surface 302B with equal or substantially equal illuminances. As such, the input received by the user interface 108 can indicate the target illuminance $E_{1D}$ as being equal to the target illuminance ED.

Furthermore, the input received by the user interface 108 can explicitly indicate respective power levels for the compensatory light sources 206 and/or the background light sources 204 in the form of power (watts), current (amps), voltage (volts), luminous intensity (candelas), and/or duty cycle (e.g., a pulse width modulation duty cycle). Alternatively, the input can implicitly indicate the respective power levels for the compensatory light sources 206 in that the computing device 100 can use the target illuminances $E_{1D\text{-}6D}$ indicated by the input to calculate the respective power levels for the compensatory light sources 206.

As noted above, in some cases each of the compensatory light sources 206 includes a plurality of single-color light sources, for example a red LED, a blue LED, and a green LED. Thus, the target illuminances $E_{1D\text{-}6D}$ discussed above can each take the form of a three-dimensional vector that includes a first element indicating a target illuminance for the red LED, a second element indicating a target illuminance for the blue LED, and a third element indicating a target illuminance for the green LED.

In some examples, it is beneficial to adjust or initialize the power levels of the compensatory light sources 206 based on observed lighting conditions. As such, the computing device 100 can detect, via the photosensor 208 (e.g., positioned in the vicinity of the surface 302A), a maximum illuminance corresponding to the surface 302A. That is, the computing device 100 determines that the illuminance upon the surface 302A is greater than any illuminances upon the other surfaces 302B-F of the object 301. The maximum illuminance is generated by the background light sources 204 (e.g., with the compensatory lights sources 206 disabled) and is greater than any illuminance corresponding to the other surfaces 302B-F of the object 301 and generated by the background light sources 204. Accordingly, the input received by the user interface 108 includes a request to illuminate each of the surfaces 302B-F with the maximum illuminance, that is, the same illuminance as the surface 302A. In another example, the input received by the user interface 108 includes a request to illuminate the surface 302B with the maximum illuminance, that is, the same illuminance as the surface 302A, and illuminate the surfaces 302C-F as little as possible.

As noted above, the computing device 100 uses the input received via the user interface 108 to determine the power levels for the compensatory light sources 206 based on the target illuminances $E_{1D\text{-}6D}$ and positions and orientations of the surfaces 302A-F with respect to the compensatory light sources 206, and perhaps additionally based on any additional information or requests included in the input.

More specifically, the computing device 100 will determine the power levels for the compensatory light sources 206 to best match or accommodate requests included in the input. For example, the computing device 100 will determine respective power levels for single color components of each of the compensatory light sources 206 to accommodate the target illuminances corresponding to each single color for each of the surfaces 302A-F. In examples where color is not of concern, the computing device 100 will determine the power levels for the compensatory light sources 206 to best match or accommodate requests for the target illuminances $E_{1D\text{-}6D}$ corresponding respectively to the surfaces 302A-F.

In some examples, the computing device 100 determines that operating the compensatory light sources 206 according to the determined power levels results in a minimized or reduced difference between the target illuminances $E_{1D\text{-}6D}$ and actual illuminances generated by the compensatory light sources 206 and/or the background light sources 204. The computing device 100 can perform a least squares and/or optimization analysis to find such a solution.

For instance, the computing device 100 might determine that repositioning at least one of the compensatory light sources 206 or the object 301 is necessary to achieve the target illuminances $E_{1D\text{-}6D}$ on the surfaces 302A-F.

More specifically, the computing device 100 solves the equations below:

$$\begin{bmatrix} E_1 \\ \vdots \\ E_j \end{bmatrix}_C = \begin{bmatrix} E_1 \\ \vdots \\ E_j \end{bmatrix}_D - \begin{bmatrix} E_1 \\ \vdots \\ E_j \end{bmatrix}_E \tag{1}$$

$$\underbrace{\begin{bmatrix} E_1 \\ \vdots \\ E_j \end{bmatrix}_C}_{E} = \underbrace{\begin{bmatrix} \dfrac{\cos\theta_{(1|1)}}{r^2_{(1|1)}} & \cdots & \dfrac{\cos\theta_{(1|i)}}{r^2_{(1|i)}} \\ \vdots & \ddots & \vdots \\ \dfrac{\cos\theta_{(j|1)}}{r^2_{(j|1)}} & \cdots & \dfrac{\cos\theta_{(j|1)}}{r^2_{(j|1)}} \end{bmatrix}}_{A} \underbrace{\begin{bmatrix} I_1 \\ \vdots \\ I_i \end{bmatrix}}_{I} \tag{2}$$

$$I = \underset{I}{\text{minimize}} \frac{1}{2} \|AI - E\|^2_2; \text{ subject to } \{0 \le I_i \le I_{max}\} \tag{3}$$

Applying equation (1) to FIG. 2 leads to a solution for the luminous intensity from the compensatory light sources 206. Here, j is equal to the number of reference points on surfaces of the object 301, $E_{1D\text{-}jD}$ is the target illuminances at these reference points. $E_{1E\text{-}jE}$ is the existing illuminances at the reference points, and matrix A characterizes the lighting physics and geometric relationship between the compensatory light sources 206 and the target surfaces. In one example, $E_{1D}$ is the target illuminance for the surface 302A. $E_{2D}$ is the target illuminance for the surface 302B. $E_{3D}$ is the target illuminance for the surface 302C. $E_{4D}$ is the target illuminance for the surface 302D, $E_{5D}$ is the target illuminance for the surface 302E, and $E_{6D}$ is the target illuminance for the surface 302F. In practice, the number of reference points can be larger than the number of light sources. Equation (3) provides the computed luminous intensity I that minimizes the generated illuminance AI and the desired illuminance E, under the constraints that the luminous intensity of each light source must be positive and below their physical limit.

In some examples, the background light sources 204 contribute illuminances to the surfaces 302A-F. Thus, $E_{1E}$ is the illuminance for the surface 302A caused by the background light sources 204, $E_{2E}$ is the illuminance for the surface 302B caused by the background light sources 204, $E_{3E}$ is the illuminance for the surface 302C caused by the background light sources 204, $E_{4E}$ is the illuminance for the surface 302D caused by the background light sources 204, $E_{5E}$ is the illuminance for the surface 302E caused by the background light sources 204, and $E_{6E}$ is the illuminance for the surface 302F caused by the background light sources 204. In examples where the background light sources 204 are disabled or not present, $E_{1E\text{-}6E}$ are all equal to zero.

Accordingly, $E_{1C}$ is the illuminance upon the surface 302A generated by the compensatory light sources 206 required to achieve the target illuminance $E_{1D}$, $E_{2C}$ is the illuminance upon the surface 302B generated by the compensatory light sources 206 required to achieve the target illuminance $E_{2D}$, $E_{3C}$ is the illuminance upon the surface 302C generated by the compensatory light sources 206 required to achieve the target illuminance $E_{3D}$, $E_{4C}$ is the illuminance upon the surface 302D generated by the compensatory light sources 206 required to achieve the target illuminance $E_{4D}$, $E_{5C}$ is the illuminance upon the surface 302E generated by the compensatory light sources 206 required to achieve the target illuminance $E_{5D}$, and $E_{6C}$ is the illuminance upon the surface 302F generated by the compensatory light sources 206 required to achieve the target illuminance $E_{6D}$. In examples where the background light sources 204 are disabled or not present, the vector $[E]_C$ is equal to the vector $[E]_D$.

The computing device 100 uses equation (2) and equation (3) to solve for or provide a bounded least squares optimal solution for the vector [I], where i is the number of light sources included in the compensatory light sources 206. Thus, the i×j matrix of equation (2) is used to compute the vector [I] using the vector $[E]_C$. Here, $\theta_{(x|y)}$ is equal to the angle of incidence between the light beam emitted by the light source x and the surface y and $r^2_{(x|y)}$ is the square of the distance between the light source x and the surface y. The components of the vector [I] are the luminous intensities of the respective compensatory light sources 206 required to best achieve the illuminances $[E]_C$. In this example, equation (3) uses a bounded least squares method. But it should be understood that other optimization methods are also suitable for computing the luminous intensity of the compensatory light sources 206.

Lastly, the computing device 100 causes the compensatory light sources 206 to operate according to the power levels (e.g., the luminous intensities [I]) by providing respective control signals to the compensatory light sources 206. That is, the computing device 100 determines that the control signals correspond to the desired power levels of the compensatory light sources 206.

FIG. 3 is a block diagram of a method 400 performed by the computing device 100 for illuminating the object 301. As shown in FIG. 3, the method 400 includes one or more operations, functions, or actions as illustrated by blocks 402, 404, and 406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 402, the method 400 includes receiving, via the user interface 108 of the computing device 100, input indicating target illuminances $E_{1D\text{-}6D}$ that correspond to surfaces 302A-F of the object 301. Functionality related to block 402 is described above with reference to FIG. 2.

At block 404, the method 400 includes determining, via the computing device 100, power levels [I] for the compensatory light sources 206 based on the target illuminances $E_{1D\text{-}6D}$ and positions and orientations of the surfaces 302A-F with respect to the compensatory light sources 206. Functionality related to block 404 is described above with reference to FIG. 2.

At block 406, the method 400 includes causing, via the computing device 100, the compensatory light sources 206 to operate according to the power levels [I]. Functionality related to block 406 is described above with reference to FIG. 2.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method comprising:
   receiving, via a user interface of a computing device, input in the form of information that corresponds to surfaces of an object;
   determining, via the computing device, power levels for compensatory light sources based on the information and positions and orientations of the surfaces with respect to the compensatory light sources; and
   causing, via the computing device, the compensatory light sources to operate according to the power levels,
   wherein receiving the input comprises receiving the input such that the input indicates positions, orientations, and/or power levels of one or more background light sources, and wherein determining the power levels for the compensatory light sources comprises determining the power levels for the compensatory light sources additionally based on the positions, the orientations, and/or the power levels of the one or more background light sources,
   wherein the surfaces comprise a first surface and one or more second surfaces, the method further comprising:
   detecting, via a photosensor, a maximum illuminance corresponding to the first surface, wherein the maximum illuminance is generated by the one or more background light sources and is greater than any illuminance corresponding to the one or more second surfaces and generated by the one or more background light sources,
   wherein receiving the input comprises receiving a request to illuminate each of the one or more second surfaces with the maximum illuminance, and
   wherein determining the power levels comprises determining the power levels such that the power levels accommodate the request.

2. The method of claim 1, wherein receiving the input comprises receiving the input such that the input indicates the positions of the surfaces.

3. The method of claim 1, wherein receiving the input comprises receiving the input such that the input indicates the orientations of the surfaces.

4. The method of claim 1, wherein receiving the input comprises receiving the input such that the input indicates positions of the compensatory light sources.

5. The method of claim 1, wherein receiving the input comprises receiving the input such that the input indicates orientations of the compensatory light sources.

6. The method of claim 1, wherein receiving the input comprises receiving the input such that the input indicates the power levels.

7. The method of claim 1, wherein the compensatory light sources comprise a first light source configured to emit a first color of light and a second light source configured to emit a second color of light, and wherein receiving the input comprises receiving the input such that the input indicates a first target illuminance for the first color and a second target illuminance for the second color, and wherein determining the power levels for the compensatory light sources comprises determining the power levels for the compensatory light sources additionally based on the first target illuminance for the first color and the second target illuminance for the second color.

8. The method of claim 1, wherein receiving the input comprises receiving the input such that the input indicates positions, orientations, and/or power levels of the one or more background light sources, and wherein determining the power levels for the compensatory light sources comprises determining the power levels for the compensatory light sources additionally based on the positions, the orientations, and/or the power levels of the one or more background light sources.

9. The method of claim 8, wherein determining the power levels comprises determining that operating the compensatory light sources according to the power levels results in a minimized difference between target illuminances and actual illuminances generated by the compensatory light sources and the one or more background light sources.

10. The method of claim 1, wherein determining the power levels for the compensatory light sources comprises determining that repositioning at least one of the compensatory light sources or the object is necessary to achieve target illuminances on the surfaces.

11. The method of claim 1, wherein determining the power levels comprises performing an optimization analysis.

12. A non-transitory computer readable medium storing instructions that, when executed by the computing device of claim 1, cause the computing device to perform the method of claim 1.

13. The non-transitory computer readable medium of claim 12, wherein the input indicates target illuminances corresponding to surfaces of the object, and wherein determining the power levels comprises identifying the power levels that correspond with minimizing differences between the target illuminances and actual illuminances generated by the compensatory light sources when operating according to the power levels.

14. The computing device of claim 1, comprising:

the user interface;

one or more processors; and a non-transitory computer readable medium storing instructions that, when executed by the one or more processors, cause the computing device to perform the method of claim 1.

15. The method of claim 1, wherein the input indicates target illuminances corresponding to surfaces of the object.

16. The method of claim 15, wherein the input indicates the target illuminances by indicating reflectivities of the surfaces.

17. The method of claim 15, wherein determining the power levels comprises identifying the power levels that correspond with minimizing differences between the target illuminances and actual illuminances generated by the compensatory light sources when operating according to the power levels.

18. A method comprising:

receiving, via a user interface of a computing device, input in the form of information that corresponds to surfaces of an object;

determining, via the computing device, power levels for compensatory light sources based on the information and positions and orientations of the surfaces with respect to the compensatory light sources; and causing, via the computing device, the compensatory light sources to operate according to the power levels, wherein receiving the input comprises receiving the input such that the input indicates positions, orientations, and/or power levels of one or more background light sources, and wherein determining the power levels for the compensatory light sources comprises determining the power levels for the compensatory light sources additionally based on the positions, the orientations, and/or the power levels of the one or more background light sources, wherein the surfaces comprise a first surface, a second surface, and a third surface, the method further comprising:

detecting, via a photosensor, a maximum illuminance corresponding to the first surface, wherein the maximum illuminance is generated by the one or more background light sources and is greater than any illuminance corresponding to the second surface or the third surface and generated by the one or more background light sources, wherein receiving the input comprises receiving a request to illuminate the second surface with the maximum illuminance and illuminate the third surface as little as possible, and wherein determining the power levels comprises determining the power levels such that the power levels accommodate the request.

19. A non-transitory computer readable medium storing instructions that, when executed by the computing device of claim 18, cause the computing device to perform the method of claim 18.

20. The computing device of claim 18, comprising:

the user interface;

one or more processors; and a non-transitory computer readable medium storing instructions that, when executed by the one or more processors, cause the computing device to perform the method of claim 18.

* * * * *